US009302735B2

(12) United States Patent
Tagaya et al.

(10) Patent No.: US 9,302,735 B2
(45) Date of Patent: Apr. 5, 2016

(54) BICYCLE POWER SOURCE HOLDER

(71) Applicant: Shimano Inc., Sakai, Osaka (JP)

(72) Inventors: Kensuke Tagaya, Osaka (JP); Takuro Jinbu, Osaka (JP); Satoshi Fujii, Osaka (JP); Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/591,305

(22) Filed: Jan. 7, 2015

(65) Prior Publication Data

US 2015/0210351 A1 Jul. 30, 2015

(30) Foreign Application Priority Data

Jan. 28, 2014 (JP) ................................ 2014-013440

(51) Int. Cl.
*B62M 6/90* (2010.01)
*B62M 6/55* (2010.01)
*B62J 11/00* (2006.01)

(52) U.S. Cl.
CPC . *B62M 6/90* (2013.01); *B62J 11/00* (2013.01); *B62M 6/55* (2013.01)

(58) Field of Classification Search
CPC ........................................................ B62M 6/90
See application file for complete search history.

(56) References Cited

U.S. PATENT DOCUMENTS

| | | | | | |
|---|---|---|---|---|---|
| 5,170,981 | A | * | 12/1992 | Lin ........................... | B62J 11/00 224/414 |
| 5,597,225 | A | * | 1/1997 | Davis ........................ | B62J 6/00 224/414 |
| 6,923,355 | B2 | * | 8/2005 | Campagnolo ............ | B62J 11/00 224/414 |
| 8,413,947 | B2 | | 4/2013 | Chiang | |
| 8,979,110 | B2 | * | 3/2015 | Talavasek ................ | B62M 6/90 280/279 |
| 2006/0088758 | A1 | * | 4/2006 | Wu ...................... | B60L 11/1801 429/97 |
| 2006/0186158 | A1 | * | 8/2006 | Ishikawa .................. | B62J 11/00 224/419 |
| 2006/0208453 | A1 | * | 9/2006 | Ishikawa .................. | B62J 11/00 280/288 |
| 2008/0088108 | A1 | * | 4/2008 | Yoshida .................. | B60R 16/04 280/200 |
| 2010/0237585 | A1 | * | 9/2010 | Binggeli .................. | B62M 6/90 280/288.4 |
| 2012/0145852 | A1 | * | 6/2012 | Chiang .................... | B62M 6/90 248/224.8 |
| 2012/0313344 | A1 | * | 12/2012 | Dal Pozzo ............... | B62J 11/00 280/288.4 |
| 2013/0004818 | A1 | * | 1/2013 | Honda ..................... | B62M 6/90 429/98 |
| 2015/0114734 | A1 | * | 4/2015 | Ogawa ..................... | B62M 6/90 180/68.5 |

FOREIGN PATENT DOCUMENTS

| | | |
|---|---|---|
| JP | 8-58656 A | 3/1996 |
| JP | 11-105759 A | 4/1999 |
| JP | 11-180376 A | 7/1999 |
| JP | 2013-91482 A | 5/2013 |

* cited by examiner

*Primary Examiner* — Kevin Hurley
(74) *Attorney, Agent, or Firm* — Global IP Counselors

(57) ABSTRACT

A bicycle power source holder is provided that basically has a holder main body part and a frame attaching part. The holder main body part is configured to retain a power source. The frame attaching part is configured to movably mount the holder main body part to a bicycle frame so that the holder main body part is movably mounted in a lateral direction of a bicycle.

19 Claims, 10 Drawing Sheets

BICYCLE POWER SOURCE HOLDER

CROSS-REFERENCE TO RELATED APPLICATIONS

This application claims priority under 35 U.S.C. §119 to Japanese Patent Application No. 2014-013440, filed Jan. 28, 2014. The entire disclosure of Japanese Patent Application No. 2014-013440 is hereby incorporated herein by reference.

BACKGROUND

1. Field of the Invention

This invention generally relates to a power source holder. More specifically, the present invention relates to power source holder that can attach a power source to a bicycle frame.

2. Background Information

In recent years, many technologies for bicycles in which electrical components are installed on a bicycle to improve the convenience for the rider are being developed. For example, assisted bicycles that assist the human power of the rider with an electric motor have been developed (see, for example, Japanese Laid-Open Patent Publication No. 11-180376). Additionally, an electric gear change mechanism that can carry out the gear change operation of a bicycle with a button operation has been developed. These electric components, such as electric motors and electric gear change mechanisms, have electric power supplied to them from a power source that is fixed to the frame of the bicycle.

SUMMARY

Generally, the present disclosure is directed to various features of power source holder. If the power source is fixed to the bicycle frame, there is the risk that the power source will be damaged by an impact when the bicycle topples over or when an undesired force acts on the power source or the power source holder is in the lateral direction.

One object of the present invention is to provide a bicycle power source holder that reduces an impact that is applied to a power source.

In one aspect, a bicycle power source holder is provided that comprises a holder main body part and a frame attaching part. The holder main body part is configured to retain a power source. The frame attaching part is configured to movably mount the holder main body part to a bicycle frame so that the holder main body part is movably mounted in a lateral direction of a bicycle.

In this bicycle power source holder, the holder main body part that retains the power source is attached to the bicycle frame by a frame attaching part in order to be able to move in the lateral direction. With this, even if an impact in the lateral direction acts on the holder main body part, the holder main body part can move in the lateral direction, which is the direction in which the impact acts. For this reason, the impact that acts on the holder main body part, which is a member that retains the power source, can be reduced, and the impact applied to the power source can also be reduced.

The frame attaching part can comprise an elongated hole section that is formed with at least one elongated hole that extends in the lateral direction with respect to the bicycle while the holder main body part is mounted to the bicycle frame. In this case, when the frame attaching part is attached to the bicycle, the elongated hole section is disposed extending in the lateral direction of the bicycle. For this reason, the holder main body part becomes movable in the lateral direction when an impact is applied by fixing the frame attaching part with a fixing member in the elongated hole section.

Also the the elongated hole section can be provided a plurality of the elongated holes plurality of elongated holes. In this case, since a plurality of elongated hole sections are provided, the frame attaching part can be stably attached to the bicycle.

The frame attaching part can further comprise a fixing member that passes through the at least one elongated hole to fix the elongated hole section to the bicycle frame. In this case, by fixing the fixing member to the bicycle passing through the elongated hole, the frame attaching part becomes movable in the lateral direction when an impact is applied to the holder main body part.

The holder main body part can comprise a first holder main body portion that is configured to retain a first end part of the power source, and a second holder main body portion that is configured to retain a second end part of the power source. In this case, since the power source is retained on both ends, the power source can be stably retained.

The frame attaching part can also comprise a first frame attaching portion that is configured to attach the first holder main body portion to the bicycle frame, and a second frame attaching portion that is configured to attach the second holder main body portion to the bicycle frame. In this case, the first holder main body portion can be attached to the first frame attaching portion, and the second holder main body portion can be separately attached to the second frame attaching portion. For this reason, disposing the frame attaching part to the part where the power source is disposed will not be necessary, so the frame attaching part can be made to be lightweight.

The frame attaching part is integrally formed with the first holder main body portion and the second holder main body portion for mounting the first holder main body portion and the second holder main body portion to the bicycle frame. In this case, individually disposing a frame attaching part to the frame will not be necessary, so attaching the frame attaching part to the frame will become easy.

The holder main body part can detachably retain the power source. In this case, replacing the power source will be easy.

The holder main body part and the frame attaching part can be integrally formed. In this case, the power source holder can be attached to the frame by just attaching the frame attaching part to the frame.

The bicycle power source holder can further comprise a locking part configured to lock the power source in a state in which the power source is retained to the holder main body part. In this case, since the power source is locked in a state of being retained in the retaining section, falling of the power source while riding and theft of the power source while the bicycle is parked can be prevented.

The holder main body part can non-detachably retain the power source as well. In this case, the power source can be prevented from falling while riding the bicycle.

The frame attaching part can be attached to the bicycle frame so that, while mounted to the bicycle frame, when a predetermined force is applied to the holder main body part in a lateral direction, the holder main body part moves in the lateral direction of the bicycle. In this case, when the bicycle topples over, or when an undesired force is applied to the power source or the holder main body in the lateral direction, the holder main body part will move laterally via the frame attaching part, so that the impact that is applied to the power source can be reduced.

The frame attaching part can comprise a retaining section configured to detachably retain the holder main body part. In this case, since the holder main body part is detachable, the holder main body part can be easily replaced.

The frame attaching part can comprise a movement preventing section that prevents movement of the holder main body part in a longitudinal direction of a bicycle while the holder main body part is retained. In this case, even if inertial force in the longitudinal direction acts on the holder main body part due to the acceleration and deceleration while riding, the holder main body part that is attached to the frame attaching part will not move back and forth with respect to the frame attaching part.

The bicycle power source holder can further comprise a regulating section that regulates movement of the holder main body part when the holder main body part detaches from the frame attaching part. In this case, even if the holder main body part detaches from the frame attaching part, the holder main body part is less likely to drop to the road surface.

The regulating section can be configured by a bendable member. In this case, by bending the regulating section, the regulating section can be compactly disposed.

The bendable member can be a string-like member. In this case, the regulating section becomes more compact.

The retaining section can comprises an elastic member having a C-shaped cross section. In this case, since the retaining section can elastically retain the holder main body part, the attachment and detachment of the holder main body part become easy.

In another aspect of the present invention, a bicycle power source holder is provided that basically comprises a holder main body part and a frame attaching part. The holder main body part is configured to retain a power source. The frame attaching part is configured to attach the holder main body part to a bicycle frame. The frame attaching part is detachable to the holder main body part in a direction that intersects with a longitudinal direction of the holder main body part when an impact is applied to the holder main body part.

In this bicycle power source holder, when an impact is applied to the holder main body part that is attached to the frame via the frame attaching part, the holder main body part detaches in a direction that intersects with the longitudinal direction of the holder main body part. For this reason, the impact that is applied to the power source can be reduced.

According to the present invention, even when an impact is applied to the power source when the bicycle topples over or when an undesired obstacle comes into contact with the power source or the holder main body part, the impact applied to the power source can be reduced with the holder main body part moving in the lateral direction or with the holder main body part detaching in a direction that intersects with the longitudinal direction of the holder main body part.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
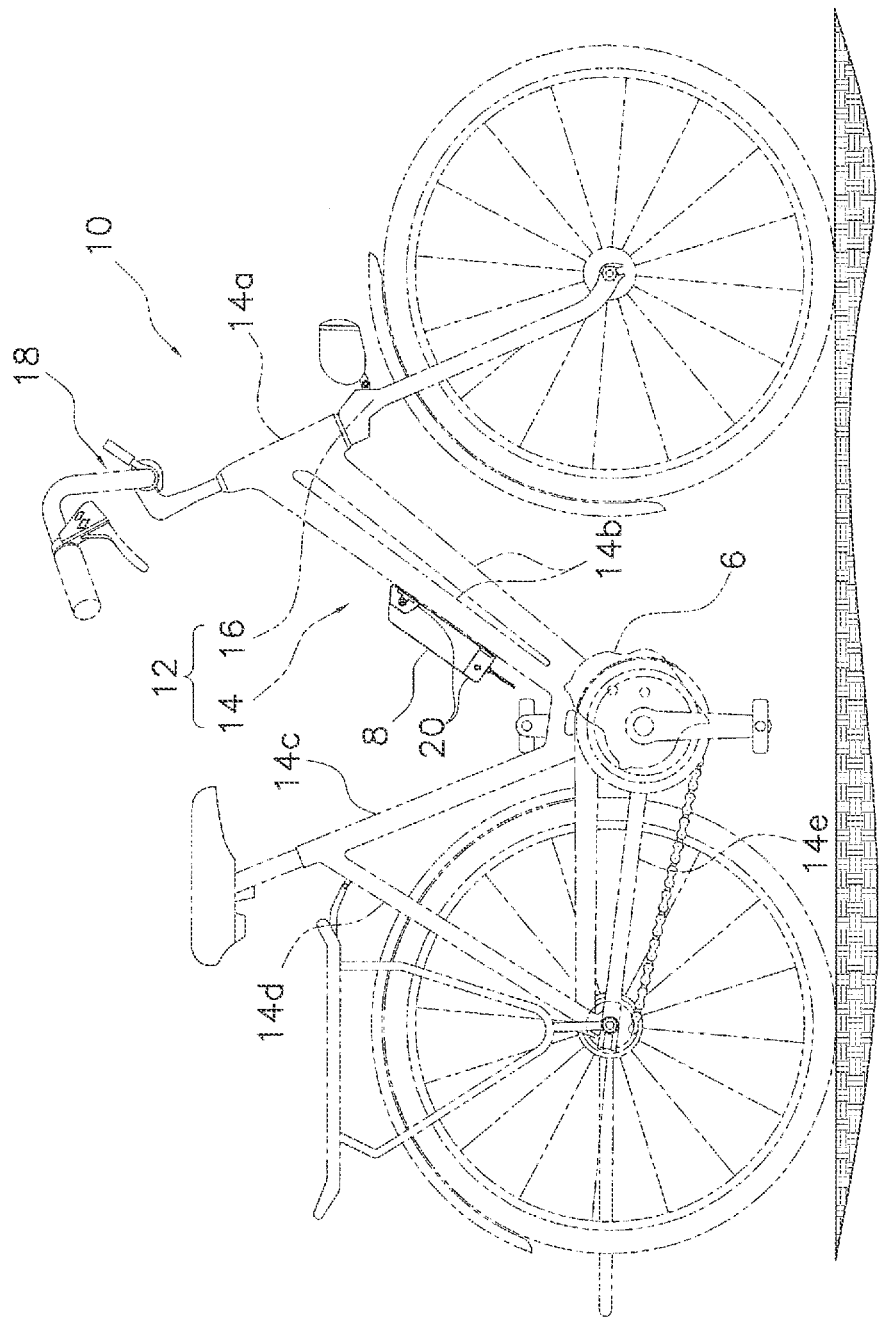
FIG. 1 is a side elevational view of a bicycle that equipped with a bicycle power source holder in accordance with a first embodiment.

Referring initially to FIG. 1, a bicycle 10 is illustrated with a bicycle power source holder 20 (hereinafter referred to simply as the power source holder) in accordance with a first embodiment. In FIG. 1, the bicycle 10 has a parallel-type frame 12, The frame 12 comprises a frame main body 14, a front fork 16 and a handle section 18. The front fork 16 is pivotally installed on the front part of the frame main body 14 around an oblique axis. The frame main body 14 comprises a head tube 14a, a pair of down tubes 14b, a seat tube 14c, a seat stay 14d and a chain stay 14e. The front fork 16 is pivotally mounted to the head tube 14a. Meanwhile, the frame is not limited to a parallel-type frame. Rather, the power source holder 20 can be applied to all bicycle frames, such as diamond-shaped frames and a frame that has a swing arm on the rear wheel side. Also, the frame comprises accessories, such as a mudguard that is attached to the frame main body 14, a front basket and a rear carrier.

An electric assist mechanism 6 is installed on the bicycle 10 that assists the manually applied force of the rider with a motor. The electric assist mechanism 6 is installed in the hanger part of the bicycle. The electric assist mechanism 6 comprises at least a motor. The motor is preferably an electric motor. In the first embodiment, the electric assist mechanism 6 includes a gear changing device on top of the motor inside. Meanwhile, the terms up, down, front, back, left, and right as used herein refer to the up, down, front, back, left, and right directions of the bicycle 10 to which the power source holder 20 is mounted.

Figure 2:
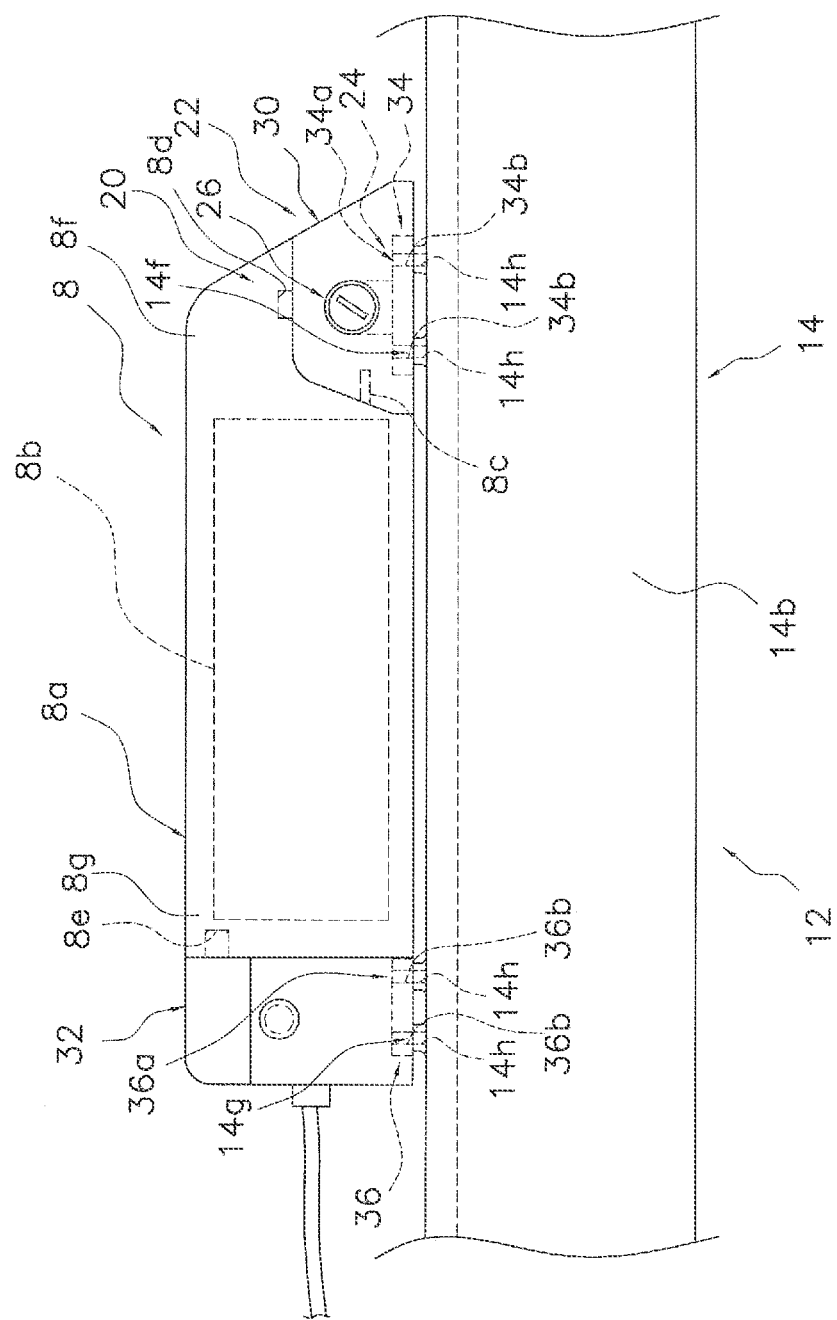
FIG. 2 is a side elevational view of the bicycle power source holder.

In FIG. 2, a power source 8 is retained to the power source holder 20. In the first embodiment, the power source 8 is used as the power source of the electric assist mechanism 6. In the first embodiment, the power source holder 20 comprises a power source case 8a and a plurality of power storage elements 8b. The power storage elements 8b are housed inside of the power source case 8a. The power storage element 8b comprises, for example, a rechargeable secondary battery or a large-capacity capacitor, etc. In the first embodiment, the power storage element 8b comprises, for example, a plurality of unitized lithium ion secondary batteries or nickel metal hydride secondary batteries. As shown in FIG. 2, the power source case 8a comprises an engaging protrusion 8c, a first engaging recess 8d and a second engaging recess 8e. The engaging protrusion 8c engages with a first holder main body portion 30 of the housing main body 22 mentioned below. The first engaging recess 8d engages with the locking part 26 mentioned below. The second engaging recess 8e engages with the second holder main body portion 32 of the holder main body part 22.

Figure 4:
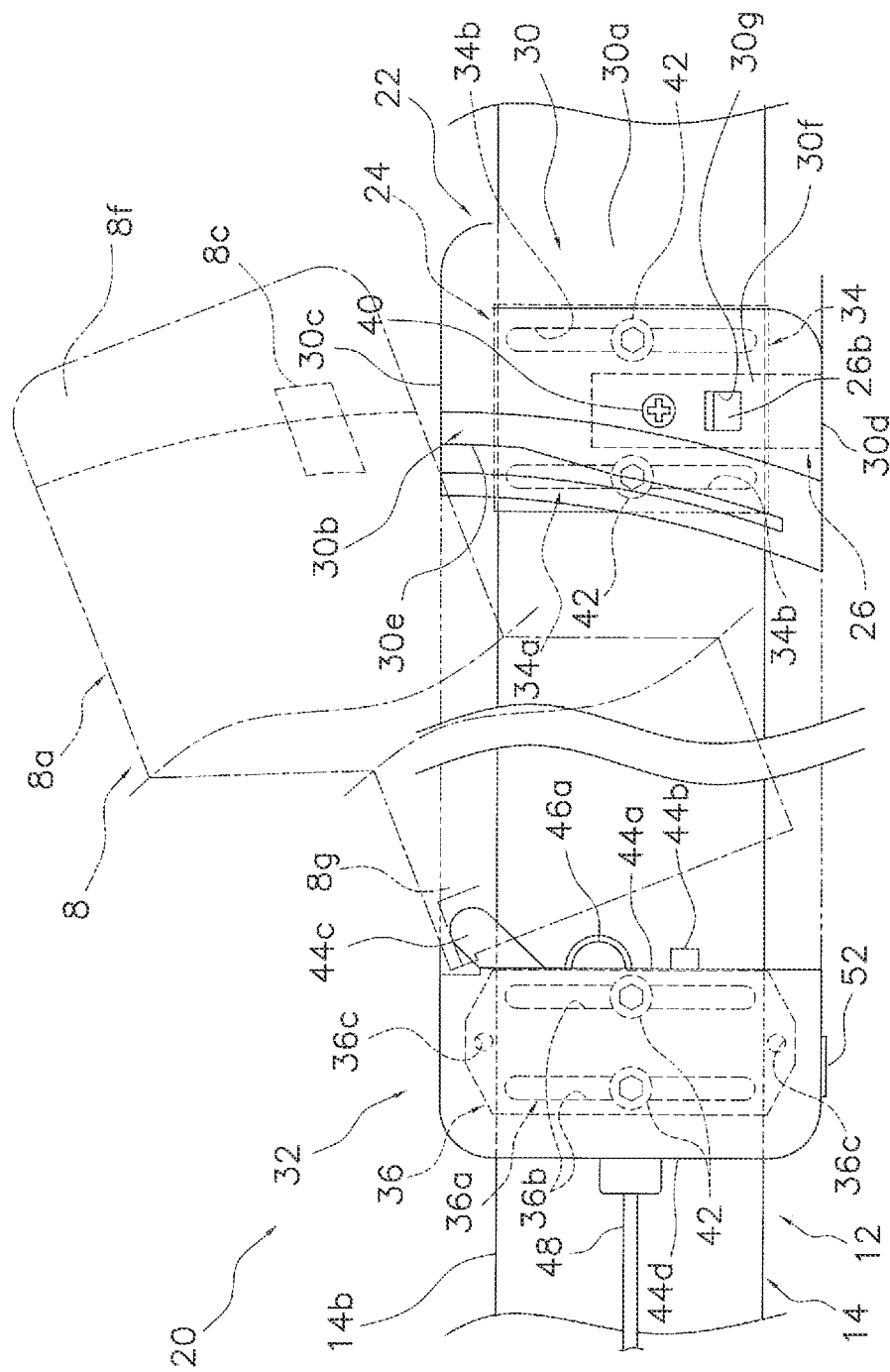
FIG. 4 is an enlarged top plan view of the bicycle power source holder.

In FIG. 2, the power source holder 20 according to the first embodiment of the present invention is attached to the bicycle frame 12. In the first embodiment, the power source holder 20 is attached to a down tube 14b of the frame main body 14, but the power source holder 20 can be attached to a seat tube 14c. In the case that the frame main body comprises a top tube, the power source holder can be attached to this top tube as well. The power source holder 20 comprises a holder main body part 22 a frame attaching part 24 and a locking part 26. The holder main body part 22 is configured to retain the power source 8. In the first embodiment, the holder main body part 22 and the frame attaching part 24 are formed as separate members. In the frame attaching part 24, the holder main body part 22 is movable in a lateral direction of the bicycle 10. The holder main body part 22 is configured to be mounted to the down tube 14b of the frame 12 of the bicycle 10. Here, the down tube 14b includes a first screw hole section 14f and a second screw hole section 14g. Each of the first and second screw hole sections 14f and 14g includes a pair of screw holes 14h. The first and second screw hole sections 14f and 14g are spaced apart in a longitudinal direction of the down tube 14b. The locking part 26 is configured so that the power source 8 can be locked in a state in which the power source 8 is retained to the holder main body part 22. In the first embodiment, the holder main body part 22 detachably retains the power source 8. The power source 8, as shown in FIG. 4, is detached by pivoting from one side surface of the holder main body part 22. In the first embodiment, the power source 8 is detached from the left side surface of the holder main body part 22.

Figure 3:
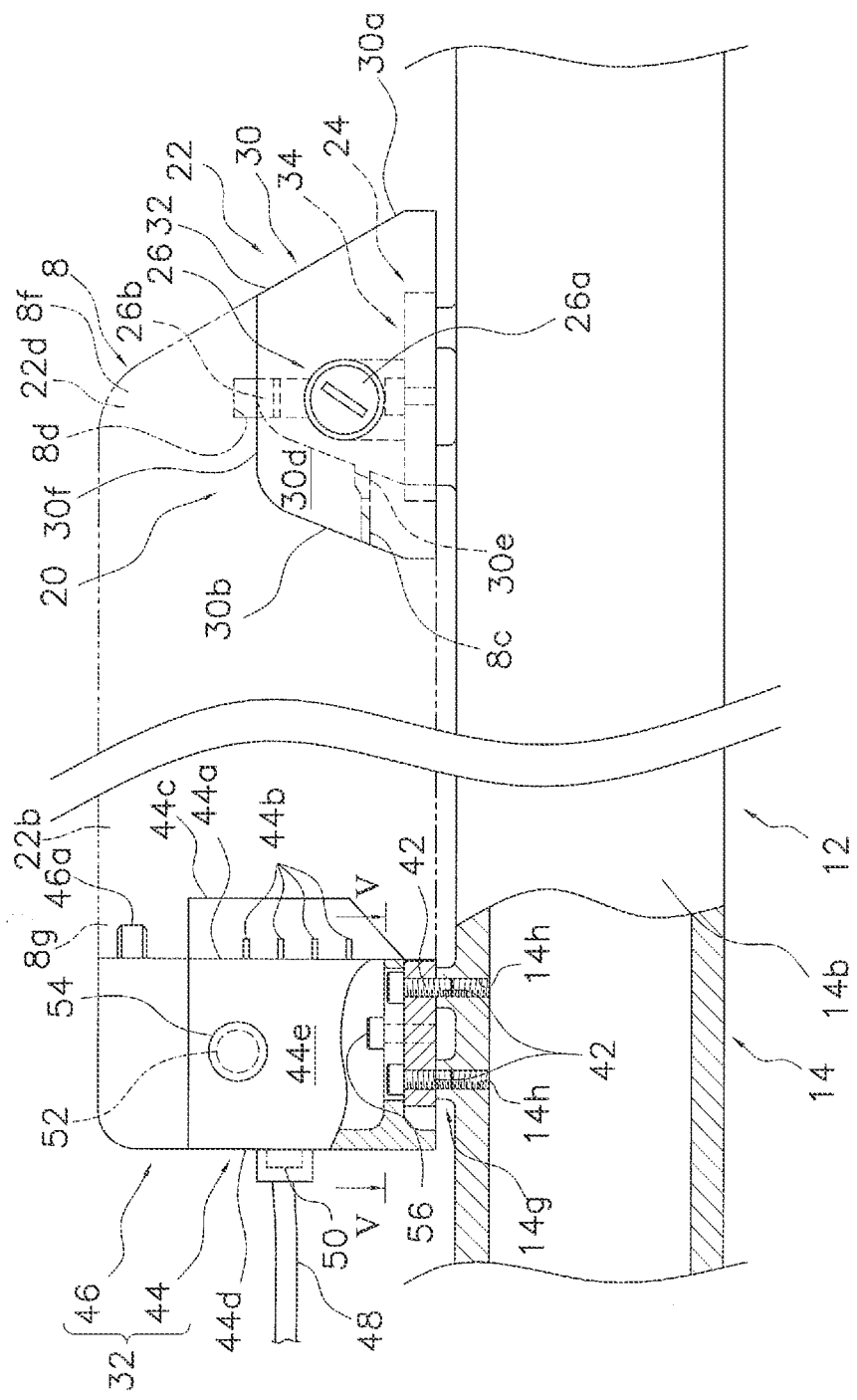
FIG. 3 is an enlarged side partial cross-sectional view of the bicycle power source holder.
Figure 5:
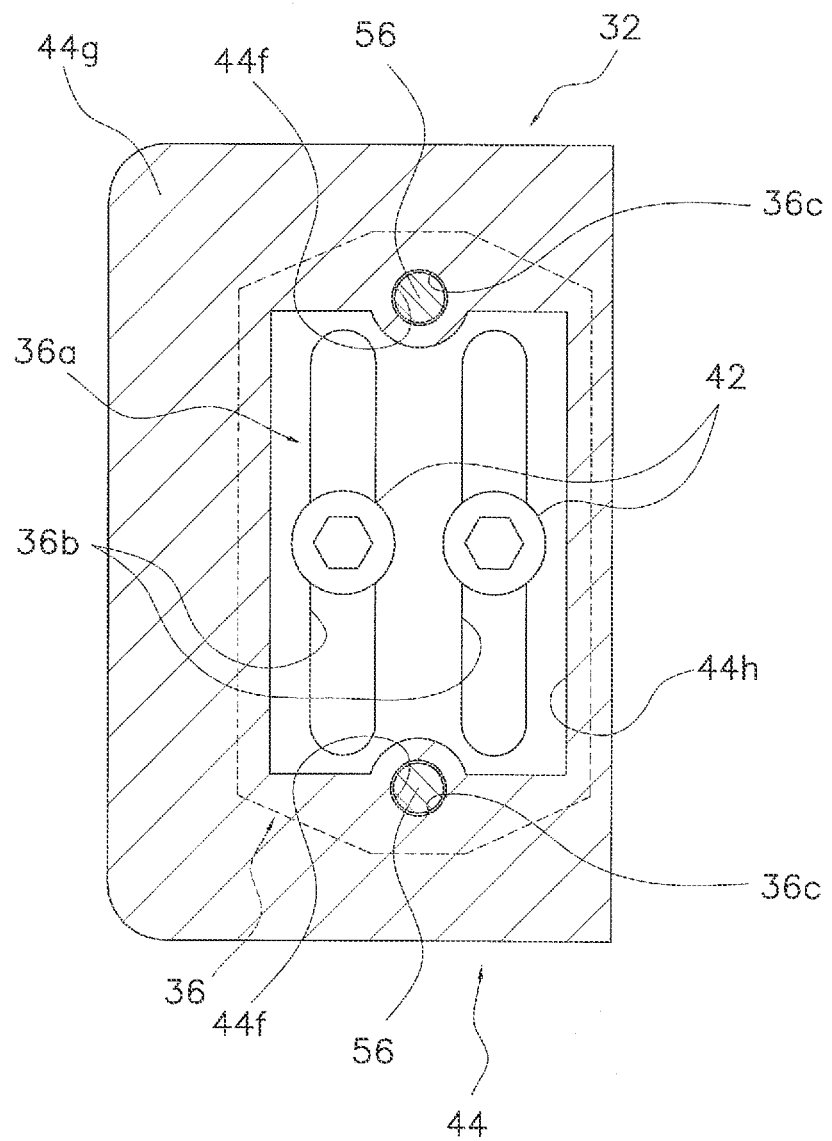
FIG. 5 is a cross-sectional view of the bicycle power source holder as seen along section line V-V in FIG. 3.

As shown in FIGS. 3 to 5, the holder main body part 22 comprises a first holder main body portion 30 and a second holder main body portion 32. The first holder main body portion 30 detachably retains one end part 22a of the power source 8. The second holder main body portion 32 detachably retains the other end part 22b of the power source 8. The frame attaching part 24 comprises a first frame attaching portion 34 and a second frame attaching portion 36. The first frame attaching portion 34 attaches the first holder main body portion 30 to the frame 12 of the bicycle 10. The second frame attaching portion 36 attaches the second holder main body portion 32 to the frame 12 of the bicycle 10.

The first holder main body portion 30 is provided so as to cover the first frame attaching portion 34 from the opposite side of the frame 12. The first holder main body portion 30 is fixed to the first frame attaching portion 34 by, for example, a first bolt member 40 via the locking part 26. The first holder main body portion 30 has a first end surface 30a and a second end surface 30b. The first end surface 30a is configured as an inclined surface that inclines toward the side with the second holder main body portion 32 while extending away from the first frame attaching portion 34. The second end surface 30b is formed as a recess in the lateral direction of the second holder main body portion 32 and as a circular arc with the end part of the first holder main body portion 30 (as shown in FIG. 4, in the present embodiment, the left side end part of the second holder main body portion 32) as the center. The second end surface 30b is further configured by an inclined surface that inclines toward the side with the first end surface 30a while extending away from the first frame attaching portion 34. Therefore, the length of the direction along the frame of the first side surface 30c of the first end side in the lateral direction of the first holder main body portion 30 (as shown in FIG. 4, in the present embodiment, the left side of the first holder main body portion 30) is shorter than the length of the direction along the frame of the second side surface 30d of the other end side in the lateral direction of the first holder main body portion 30 (as shown in FIG. 4, in the present embodiment, the right side of the first holder main body portion 30). An engaging groove 30e is formed on the second end surface 30b. The engaging groove 30e positions the power source 8 and engages with the power source 8. The engaging groove 30e opens to the first side surface 30c and extends in a circular arc shape from the first side surface 30c to the front of the second side surface 30d. The engaging section 8c that is provided on the first end section 8f of the power source case 8a of the power source 8 engages with the engaging groove 30e. The groove width of the end part of the second side surface 30d side of the engaging groove 30e is substantially the same length as the thickness of the engaging section 8c. Here, the groove width of the engaging groove 30e extends in a direction that is perpendicular to the direction that the frame extends and the lateral direction thereof. The groove width of the first side surface 30c side of the engaging groove 30e is larger than the groove width of the second side surface 30d side. The engaging groove 30e comprises an inclined surface in which the groove width becomes narrower while extending from the first side surface 30c to the second side surface 30d. With this inclined surface, the engaging section 8c is reliably guided to the part with the narrow groove width on the second side surface 30d side of the engaging groove 30e and is positioned by and engages with the engaging groove 30e. A rectangular opening 30g is formed through which a latch 26b of the locking part 26, mentioned below, can pass. The rectangular opening 30g is formed on the opposite side surface 30f of the frame of the first holder main body portion 30.

The first frame attaching portion 34 is a synthetic resin or a metallic member that is generally a rectangular plate. The first frame attaching portion 34 comprises a first elongated hole section 34a. The elongated hole section 34a includes at least one first elongated hole 34b that extends laterally in a state in which the holder main body part 22 is attached to the bicycle 10. In the first embodiment, two first elongated holes 34b are disposed that are spaced longitudinally in the longitudinal direction in which the frame 12 extends. The two first elongated holes 34b are disposed in a position that can oppose the screw hole 14h of the first screw hole section 14f. The first frame attaching portion 34 is fixed to the down tube 14b by two second bolt members 42. The second bolt members 42 pass through the first elongated hole 34b and screw onto the screw hole 14h. The two second bolt members 42 are disposed in a position other than the two end parts of the first elongated hole 34b. With this, the first frame attaching portion 34 becomes movable in any direction in the lateral direction. The two second bolt members 42 are an example of a fixing member. The locking part 26 is fixed to the first frame attaching portion 34.

The second holder main body portion 32 is fixed to the second frame attaching portion 36. The second holder main body portion 32 comprises a main body member 44 and a cover member 46. The main body member 44 has an opened end part on the opposite side of the frame 12. The main body member 44 has a housing space inside. The cover member 46 covers the opening of the main body member 44. The cover member 46 is fixed to the main body member 44 by, for example, a screw member on a first surface 44a that opposes the first holder main body portion 30. A power source circuit (not shown) is provided inside of the main body member 44. The power source circuit is connected to the power source 8. The first surface 44a is provided with a plurality of connection terminals 44b. The connection terminals 44b can be electrically connected to the power source terminals provided on the power source 8 when the power source 8 is retained to the second holder main body portion 32. Additionally, the first surface 44a is provided with a protrusion 44c. The protrusion 44c protrudes obliquely toward one side in the lateral direction (as shown in FIG. 4, in the present embodiment, the right side of the second holder main body portion 32). The protrusion 44c is used for pivoting the power source 8 around the tip part of the protrusion 44c as the center while abutting the other end part when attaching the power source 8 to the first holder main body portion 30 and the second holder main body portion 32. The main body member 44 has a second surface 44d, which is on the opposite side of the first surface 44a in the direction in which the frame extends. The second surface 44d is provided with an output connector 50 to which a power line 48 is detachably and electrically connected. The power line 48 supplies electric power to the electric components (for example, the electric assist mechanism 6). The power line 48 can be non-detachably fixed to the main body member 44 as well. The main body member 44 has a third surface 44e, which is one surface in the lateral direction of the second holder main body portion 32. The third surface 44e is provided with a charging terminal 52 for charging the power source 8. The charging terminal 52 is covered by a cap 54. The main body member 44 has a surface 44g on the frame side of the main body member 44 are formed two through-holes 44f (see FIG. 5). A third bolt member 56 passes through the two through-holes 44f for fixing the main body member 44 to the second frame attaching portion 36. Additionally, the main body member 44 has a surface 44g on the frame side of the main body member 44. The surface 44g is provided with an opening 44h for exposing the head part of the second bolt member 42 that fixes the second frame attaching portion 36 to the frame 12. The opening 44h is formed larger than the second elongated hole 36b. Here, the entirety of each second elongated hole 36b is exposed. The opening 44h is formed generally as a rectangle in the present embodiment. A positioning protrusion 46a is provided on the cover member 46 for positioning the second end section 8g of the power source case 8a. The positioning protrusion 46a is provided so as to engage with the second engaging recess 8e of the power source case 8a (see FIG. 2). The positioning protrusion 46a is also provided so as to carry out positioning in the lateral direction of the power source case 8a and in the direction that approaches and moves away from the frame (the lateral direction and the direction that is perpendicular to the direction in which the frame extends).

The second frame attaching portion 36 is a generally rectangular synthetic resin or a metallic plate member. The second frame attaching portion 36 comprises a second elongated hole section 36a. The second elongated hole section 36a includes least one second elongated hole 36b that extends laterally in a state in which the holder main body part 22 is attached to the bicycle 10. In the first embodiment, two second elongated holes 36b are disposed that are spaced longitudinally in the longitudinal direction in which the frame 12 extends. The two second elongated holes 36b are disposed in a position that can oppose the screw hole 14h of the second screw hole section 14g. The second frame attaching portion 36 is fixed to the down tube 14b by two second bolt members 42. The second bolt members 42 pass through the second elongated hole 36b and screw onto the screw hole 14h. The two second bolt members 42 are disposed in a position other than the two end parts of the second elongated hole 36b. With this, the second frame attaching portion 36 becomes movable in any direction in the lateral direction. The two second bolt members 42 are an example of a fixing member. In the second frame attaching portion 36 are provided two fixing screw holes 36c for fixing the main body member 44 of the second holder main body portion 32 with an interval in the lateral direction. The main body member 44 is fixed to the second frame attaching portion 36 by the third bolt member 56 that screws onto the fixing screw hole 36c.

As shown in FIGS. 3 and 4, the locking part 26 comprises a cylinder lock 26a and a latch 26b. The cylinder lock 26a is fixed to the first frame attaching portion 34. The latch 26b can be retracted by the cylinder lock 26a. The cylinder lock 26a can be rotated by a key (not shown). The latch 26b can be advanced from the upper surface of the first holder main body portion 30. The latch 26b locks the power source 8 that is mounted on the power source holder 20. Thus, the power source 8 will not detach from the power source holder 20. The latch 26b is biased in the advancing direction. The latch 26b can be retracted against the biasing force by the cylinder lock 26a. The latch 26b is retracted by being pressed by the power source 8 when attaching the power source 8. When the power source is disposed in the engaging position of the first holder main body portion 30, the latch advances to the first engaging recess 8d of the power source 8 and locks the power source 8. When releasing the lock of the power source 8, the cylinder lock 26a should be turned in the direction that retracts the latch 26b with a key.

In the power source holder 20 configured in this way, when retaining the power source 8 to the power source holder 20, as indicated by the chain double-dashed line in FIG. 4, the inner side surface of the second end section 8g of the power source case 8a of the power source 8 is in contact with the protrusion 44c of the second holder main body portion 32, and engages the engaging section 8c of the first end section 8f with the engaging groove 30e of the first holder main body portion 30. Then, this surface is pivoted to the mounting position where the engaging section 8c abuts the end part of the engaging groove 30e on the second side surface 30d. With this, the power source 8 is mounted to the holder main body part 22. At the time of the turning of this power source 8, the power source case 8a retracts the latch 26b tier the time being, and the latch 26b advances in the mounting position and engages with the second engaging recess 8e; the power source 8 is then locked to the holder main body part 22.

When removing the power source 8, the cylinder lock 26a is turned with the key, and the latch 26a is forcibly retracted. In this state, by further pivoting the power source 8 from the mounting position, the power source 8 is removed from the holder main body part 22.

The holder main body part 22 is attached to the frame 12 in order to be able to move in the lateral direction by the frame attaching part 24. Specifically, the first frame attaching portion 34 and the second frame attaching portion 36 of the frame attaching part 24 each comprises a first elongated hole section 34a and a second elongated hole section 36a. The first elongated hole section 34a has a first elongated hole 34b that extend in the lateral direction. The second elongated hole section 36a has a second elongated hole 36b that extend in the lateral direction. Under normal riding conditions, the first frame attaching portion 34 is attached to the frame by the first bolt member 40, and the second frame attaching portion 36 is attached to the frame by the second bolt member 42 so that the first frame attaching portion 34 and the second frame attaching portion 36 will not move relative to the frame. When an impact is applied to the power source 8 or the power source holder 20, and a predetermined force in the lateral direction is applied to the power source holder 20, the frame attaching part 24 will move in the lateral direction with respect to the frame 12 against the fixing force of the first bolt member 40 and the second bolt member 42, so that the impact that is applied to the power source 8 can be reduced.

Modified Example Of The First Embodiment

Figure 6:
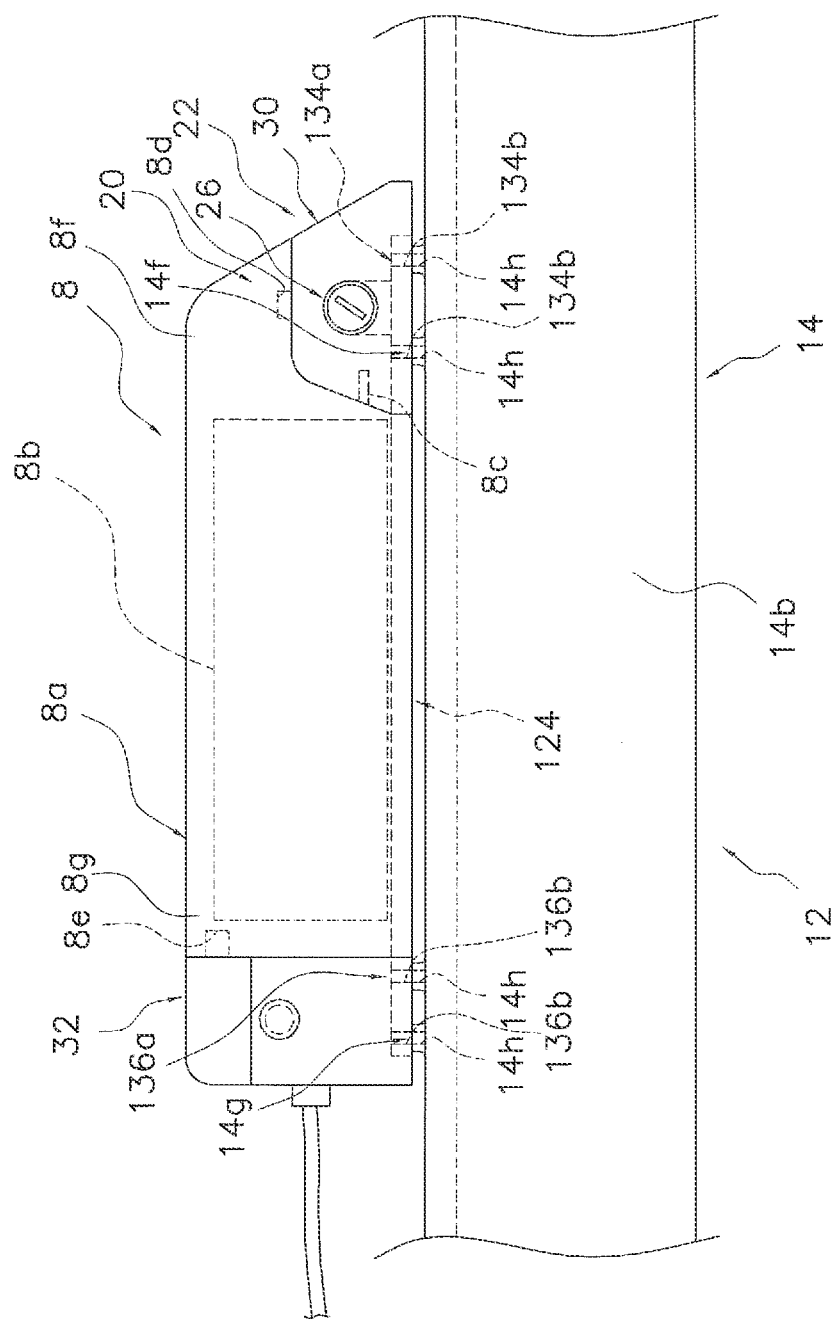
FIG. 6 is a side elevational view, similar to FIG. 2, of a modified example of a bicycle power source holder.

In a modified example of the first embodiment, as shown in FIG. 6, only the configuration of the frame attaching part 124 of the power source holder 120 differs from the first embodiment, and the other configurations are the same as those in the first embodiment. Therefore, the configurations besides the frame attaching part 124 will be given the same reference symbols in FIG. 6 as in the first embodiment, and their explanations will be omitted.

In FIG. 6, the frame attaching part 124 is integrally formed, and the entirety of the holder main body part 22. including the first holder main body portion 30 and the second holder main body portion 32 can be attached to the down tube 14*b* of the frame 12 of the bicycle 10. The frame attaching part 124 is a synthetic resin or a metallic member that is generally a rectangular plate. The frame attaching part 124 is firmed extending from the first holder main body portion 30 to the second holder main body portion 32 along the direction in which the frame 12 extends. The frame attaching part 124 comprises a first elongated hole section 134*a*. The first elongated hole section 134*a* has at least one first elongated hole 134*b* that extends laterally in a state in which the holder main body part 22 is attached to the bicycle 10. The first elongated hole section 134*a* is covered by the first holder main body portion 30. The frame attaching part 124 comprises a second elongated hole section 136*a*. The second elongated hole section 136*a* has at least one second elongated hole 136*b* that extends laterally in a state in which the holder main body part 22 is attached to the bicycle 10. The second elongated hole section 136*a* is covered by the second holder main body portion 32. There are two the first elongated holes 134*b* and the second elongated holes 136*b*, and like the first embodiment, they are disposed in a position that can oppose the screw hole 14*h*. The locking part 26 is provided between two first elongated holes 134*b* of the frame attaching part 124. The other configurations are the same as those in the first embodiment, so as described above, their explanations are omitted. The first elongated hole 134*a* and the second elongated hole section 136*a* can be provided in a position that is covered by the power source 9, and the number of elongated holes that are formed can each be one, or there can be a plurality of them.

In the modified example, since the frame attaching part 124 is a single member, attaching this section to the frame 12 becomes easy.

Second Embodiment

Figure 7:
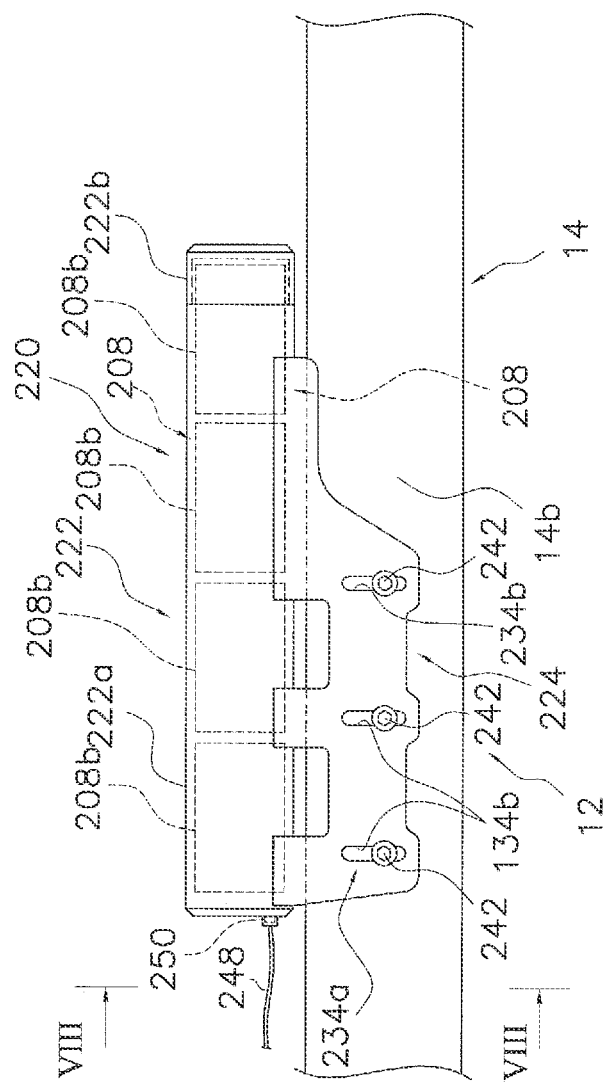
FIG. 7 is a top plan view, similar to FIG. 4, of a bicycle power source holder in accordance with a second embodiment.
Figure 8:
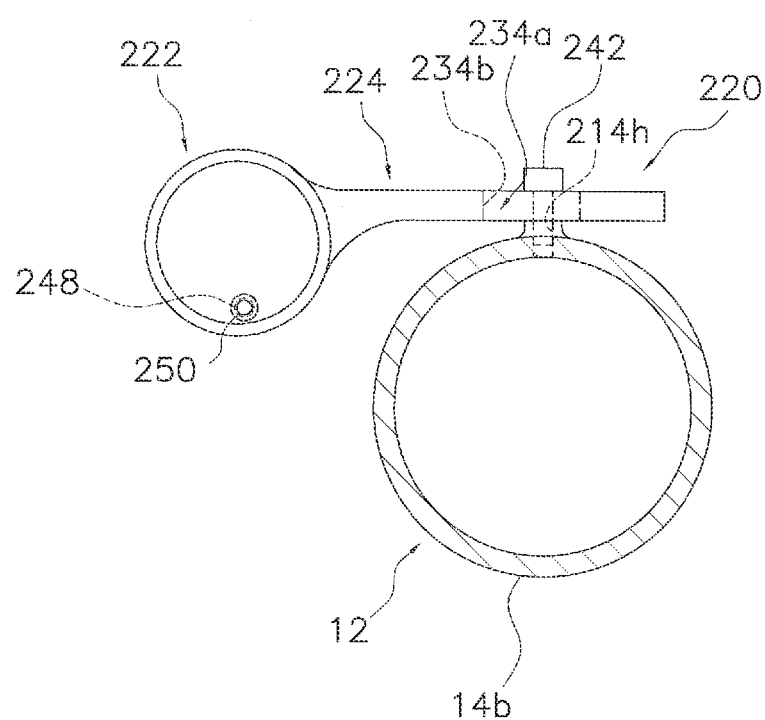
FIG. 8 is a cross-sectional view of the bicycle power source holder as seen along section line of FIG. 7.

In the second embodiment, as shown in FIGS. 7 and 8, the power source holder 220 comprises a holder main body part 222 and a frame attaching part 224. The frame attaching part 224 is integrally formed with the holder main body part 222 as a one-piece, unitary member. In the second embodiment, the power source 208 is detachable from the holder main body part 222, and the holder main body part 222 is integrally formed with the frame attaching part 224.

In FIGS. 7 and 8, the holder main body part 222 of the power source 220 is, for example, a synthetic resin or a metallic, tubular member and extends a longitudinal direction. The holder main body part 222 comprises a bottomed cylindrical main body section 222*a* and a cap member 222*b*. The bottomed cylindrical main body section 222*a* has one end is opened. The cap member 222*b* closes the opening of the main body section 222*a*. With this, the holder main body part 222 detachably retains the power source 208. The power source 208 is formed by a plurality of power storage elements 208*b* (for example, four). The power storage elements 208*b* are retained inside of the main body section 222*a*. The power storage elements 208*b* are rechargeable secondary batteries, for example lithium ion batteries or nickel metal hydride batteries. The holder main body part 222 is disposed with a space between this part and, for example, the down tube 14*b* of the frame 12 of the bicycle 10. The other end of the holder main body part 222 is provided with, for example, an output connector 250. The output connector is detachably and electrically connected the power line 248 that supplies electric power to an electric gear change mechanism of the bicycle (not shown). Therefore, the power source 208 of the second embodiment has a smaller capacity than the power source 8 of the first embodiment.

The frame attaching part 224 is, for example, a synthetic resin or a metallic plate-like member that, as mentioned above. The frame attaching part 224 is integrally formed with the holder main body part 222 as a one-piece, unitary member. In a state in which the holder main body part 222 is mounted to the bicycle 10, this part comprises an elongated hole section 234*a* having at least one elongated hole 234*b*. The elongated hole 234*h* extends laterally. In the second embodiment, the elongated hole section 234*a* has a plurality of elongated holes 234*b* (for example, three). The frame attaching part 224 is fixed to the down tube 14*b* of the frame 12 of the bicycle 10 by, for example, three second bolt members 242. The second bolt members 242 screw into screw holes 214*h* that are provided in the down tube 14*b*. In a normal riding state, the frame attaching part 224 is attached to the frame 12 by the second bolt member 242, so that the frame attaching part 224 will not move relative to the frame 12. The three second bolt members 242 are disposed in a position other than the two ends of the elongated hole 234*b*. The second bolt member 242 is an example of a fixing member. By disposing the second bolt member 242 in a position other than the two ends of the elongated hole 234*b* and by disposing the holder main body part 222 away from the down tube 14*b*, the holder main body part 222 can be moved in the lateral direction of the bicycle 10 when a predetermined force is applied in the lateral direction of the holder main body part 222.

In a power source holder 220 configured in this way, even if, for example, the bicycle topples over and a lateral impact is applied to the holder main body part 222, the holder main body part 222 is movably attached to the frame 12 in the lateral direction, which is the direction in which the impact is applied, by the frame attaching part 224. Specifically, the frame attaching part 224 comprises an elongated hole section 234*a* that comprises an elongated hole 234*b* that extends laterally. When an impact is applied to the power source holder 220 and a predetermined force in the lateral direction is applied to the power source holder 220, the frame attaching part 224 will move laterally with respect to the frame 12 against the fixing force of the second bolt member 242 and will reduce the impact that is applied to the power source 208.

Third Embodiment

Figure 9:
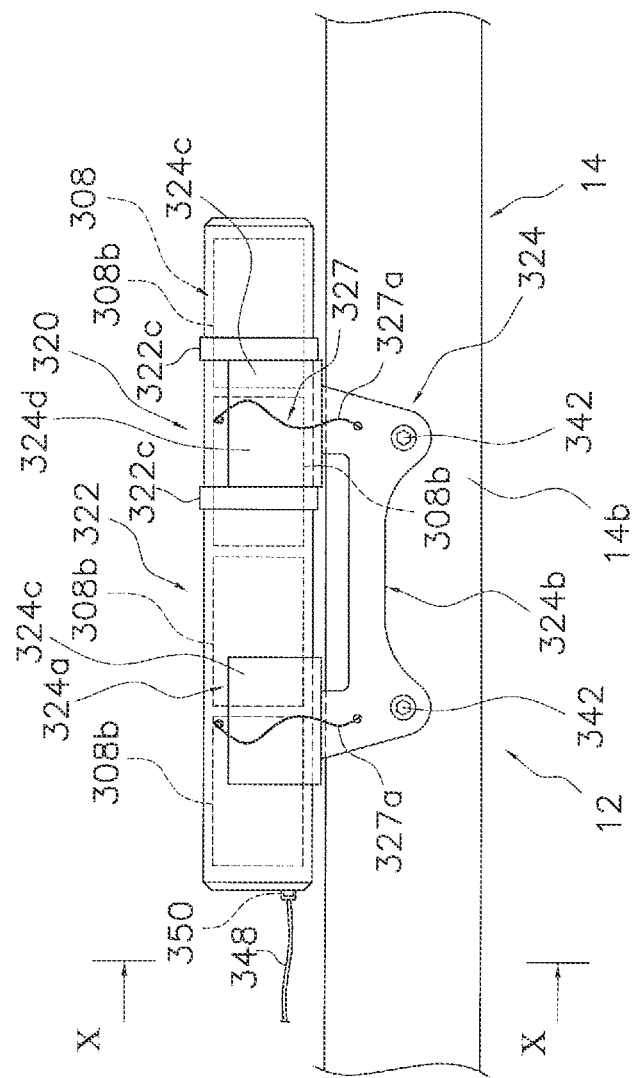
FIG. 9 is a top plan view, similar to FIG. 4, of a bicycle power source holder of a third embodiment.
Figure 10:
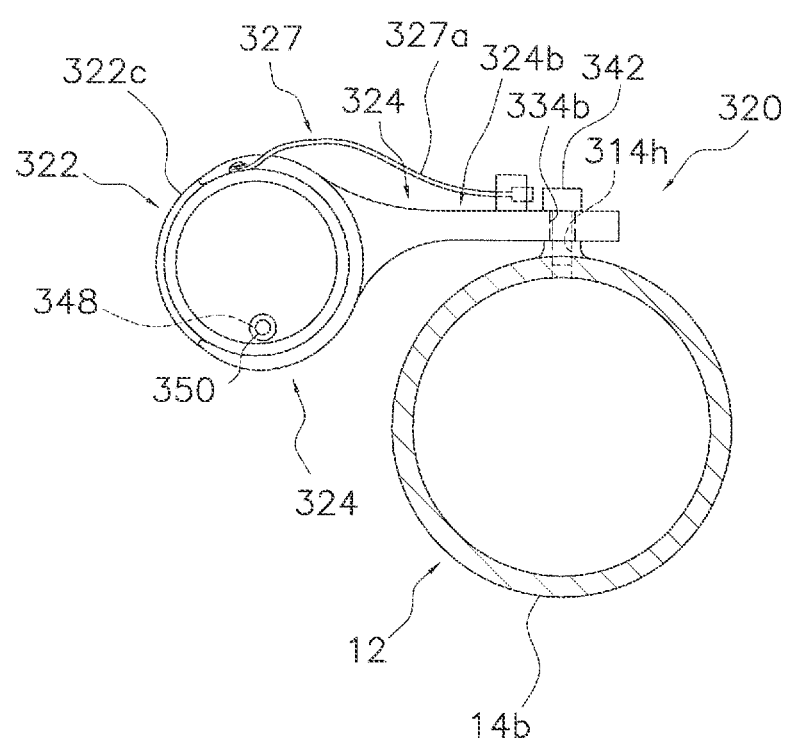
FIG. 10 is a cross-sectional view of the bicycle power source holder as seen the section line X-X in FIG. 9.

In the third embodiment, as shown in FIGS. 9 and 10, the holder main body part 322 of the power source holder 320 is configured to be detachable from the frame attaching part 324.

In FIGS. 9 and 10, the power source holder 320 comprises a holder main body part 322, a frame attaching part 324, and a regulating section 327. The holder main body part 322 is, for example, a synthetic resin or a metallic tubular member and extends in a longitudinal direction. The holder main body part 322 is a tubular member with both ends closed that non-detachably retains the power source 308. The power source 308 is formed by a plurality of power storage elements 308b (for example, four). The power storage elements 308b are retained inside of the main body section 322. The power storage elements 308b are rechargeable secondary batteries, for example lithium ion batteries or nickel metal hydride batteries On the other end of the holder main body part 322 is provided, for example, an output connector 350. The output connector 350 t is detachably and electrically connected a power line 348 that supplies electric power to an electric gear change mechanism of the bicycle (not shown). Additionally, the holder main body part 322 comprises a pair of protrusions 322c. The protrusions 322c engage with the frame attaching part 324. The protrusions 322c are provided with spaced apart in the longitudinal direction of the holder main body part 32. The protrusions 322c are cyclically formed protruding in a direction that is perpendicular to the longitudinal direction of the holder main body part 32. The protrusions 322c are provided to regulate the movement of the holder main body part 322 in the longitudinal direction by engaging with a movement preventing section 324d, mentioned below, that is provided in the frame attaching part 324. The protrusions 322c can be a discontinuous annular shape, and they need only to be a shape in which the length in the circumferential direction of the holder main body part 332 is longer than the C-shaped opening.

The frame attaching part 324 is, for example, synthetic resin or metallic and is elastic. The frame attaching part 324 can mount the holder main body part 322 to the frame 12. When an impact is applied to the holder main body part 322, the frame attaching part 324 detaches the holder main body part 322 in a direction that intersects with the longitudinal direction of the holder main body part 322. The direction that intersects the longitudinal direction of the holder main body part 322 includes the lateral direction of the bicycle. The frame attaching part 324 comprises a retaining section 324a that detachably retains the holder main body part 322 and an attaching section 324b that is integrally formed with the retaining section 324a and is used for attaching to the frame 12. The retaining section 324a comprises a retaining member 324c whose cross section that is perpendicular to the longitudinal direction of the holder main body part 322 is C-shaped in a state in which the holder main body part 322 is retained. In the present embodiment, the C-shaped opening of the retaining member 324c faces either the left or the right direction. The retaining section 324a is configured to extend along the outer perimeter surface of the holder main body part 322 in a state in which the holder main body part 322 is retained. The retaining section 324a comprises a pair of retaining members 324c that are disposed with an interval in the longitudinal direction of the holder main body part 322. The retaining member 324c elastically retains the holder main body part 322. One of the retaining members 324c is disposed between the protrusions 322c in a state in which the holder main body part 322 is retained and prevents the movement of the holder main body part 322 in the longitudinal direction. The distance between a pair of protrusions 322c in the longitudinal direction of the holder main body part 322 is nearly the same as the width of one of the retaining members 324c. One of the retaining members 324c functions as a movement preventing section 324d that prevents the movement of the holder main body part 322 in the longitudinal direction. In a normal riding state, the retaining section 324a can retain the holder main body part 322 so that the holder main body part 322 will not move relative to the frame, that is, so that the holder main body part 322 will not separate from the retaining section 324a.

The attaching section 324b is a synthetic resin or a metallic plate-like section that is fixed to the down tube 14b of the bicycle frame 12 by, for example, two second bolt members 342 provided in the down tube 14b. The second bolt members 342 screw into screw holes 314h. The attaching section 324b is coupled to the outer perimeter part of the retaining section 324a. In the present embodiment, the attaching section 324b is coupled to the opposite side of the C-shaped opening of the retaining section 324a. Here, the attaching section 324b is integrally formed with the retaining section 324a, but this section can be configured as a separate body. The two second bolt members 342 are coupled with the screw holes 314h after extending through a circular through-hole 334b that is provided on the frame attaching part 324. Therefore, in the third embodiment, the frame attaching part 324 is immovably fixed to the frame 12 and will not move laterally.

The regulating section 327 is a bendable member. The regulating section 327 is configured by a pair of string-like members 327a. The string-like member 327a is, for example, synthetic resin or metallic. One end of the string-like member 327a is coupled with the frame attaching part 324, and the other end is coupled with the holder main body part 322. The length of the string-like member 327a is a length with which the holder main body part 322 can detach from the retaining section 324a; this is adjusted to a length that, when the holder main body part 322 detaches from the retaining section 324a, the power line 348 will not come off of the output connector 350 and that the holder main body part 322 will not touch the road surface.

In a power source holder 320 configured in this way, when, for example, the bicycle topples over and an impact is applied to the holder main body part 322, that is, if a predetermined force is applied to the holder main body part 322 in a direction that intersects with the longitudinal direction of the holder main body part 322, the configuration is such that the holder main body part 322 will detach from the frame attaching part 324. Specifically, the power source holder is elastically retained to a pair of retaining members 324c of the retaining section 324a of the frame attaching part 324. When an impact is applied to the holder main body part 322 and the holder main body part 322 is detached from the retaining member 324c, the regulating section 327 regulates the movement of the holder main body part 322, With this, even if the holder main body part 322 detaches from the frame attaching part 324, the holder main body part 322 can be prevented from hitting the road surface. Additionally, the power line 348 is less likely to come off of the output connector 350. Here, when an impact is applied to the holder main body part 322, the holder main body part 322 detaches from the frame attaching part 324, so that the impact that is applied to the power source 308 can be reduced.

Meanwhile, in the third embodiment, as with the second embodiment, holder main body part 322 can detachably retain the power source 308 as well.

Other Embodiments

One embodiment of the present invention was described above, but the present invention is not limited to the above-described embodiment; various modifications can be made without departing from the scope of the invention. Specifically, the various embodiments and modified examples described in the present Specification can be freely combined according to necessity.

(a) In the above-described embodiment, the power source holder 20, 120, 220, and 320 is mounted to the down tithe 14b of the bicycle frame 12, but the present invention is not limited to this configuration, The power source holder can be mounted anywhere on the frame 12. For example, the power source holder can be mounted to the seat tube 14c or the rear carrier, etc.

(b) In the above-described embodiment, a secondary battery and a large-capacity capacitor were given as examples of the power source, hut the present invention is not limited to these examples. For example, in the case that the holder main body part detachably retains the power source, the power source can be a primary battery as well.

(c) The power source holder according to the present invention can be mounted on all bicycles equipped with electric components, such as sports bikes, road bikes and mountain bikes.

(d) In the above-described embodiment, the present invention was explained using an elongated hole that is provided on the frame attaching part that is attached to the frame or a detachable frame attaching part of the holder main body part as an example; however, the present invention is not limited to this configuration. For example, the elongated hole can be used in a configuration in which the holder main body part is fixed to the frame attaching part.

(e) In the first embodiment, the holder main body part 22 and the frame attaching part 24 were formed separately, but the holder main body part 22 and the frame attaching part 24 can be integrally formed as well.

(f) In the above-described embodiment, a screw hole is formed in the frame, but this hole can be configured so that a bolt is fixed to the framed and this bolt is passes through the elongated hole, and so that the frame attaching part is attached to the frame with a nut.

(g) In the first embodiment, the holder main body part and the frame attaching part can be integrally formed by synthetic resin, and the elongated hole of the frame attaching part can be changed to a round hole; also, the power source holder 120 can be attached to the frame so that the power source holder 120 and the frame will not move relative to each other. In this case, the configuration is such that, when an impact is applied to the power source 8 or the power source holder 20 and a predetermined force in the lateral direction is applied to the power source holder 20, at least one of the first holder main body portion 30 or the second holder main body portion 32 will break and detach from the bolt member and absorb the impact that is applied to the power source.

While only selected embodiments have been chosen to illustrate the present invention, it will be apparent to those skilled in the art from this disclosure that various changes and modifications can be made herein without departing from the scope of the invention as defined in the appended claims. Thus, the foregoing descriptions of the embodiments according to the present invention are provided for illustration only, and not for the purpose of limiting the invention as defined by the appended claims and their equivalents.

What is claimed is:

1. A bicycle power source holder comprising:
a holder main body part configured to retain a power source; and
a frame attaching part configured to movably mount the holder main body part to a bicycle frame so that the holder main body part is movably mounted in only a linear lateral direction of a bicycle.

2. The bicycle power source holder as recited in claim 1, wherein
the holder main body part comprises a first holder main body portion that is configured to retain a first end part of the power source, and a second holder main body portion that is configured to retain a second end part of the power source.

3. The bicycle power source holder as recited in claim 2, wherein
the frame attaching part comprises a first frame attaching portion that is configured to attach the first holder main body portion to the bicycle frame, and a second frame attaching portion that is configured to attach the second holder main body portion to the bicycle frame.

4. The bicycle power source holder as recited in claim 2, wherein
the frame attaching part is integrally formed with the first holder main body portion and the second holder main body portion for mounting the first holder main body portion and the second holder main body portion to the bicycle frame.

5. The bicycle power source holder as recited in claim 1, wherein
the holder main body part is configured to detachably retain the power source.

6. The bicycle power source holder as recited in claim 1, further comprising
a locking part configured to lock the power source in a state in which the power source is retained to the holder main body part.

7. The bicycle power source holder as recited in claim 1, wherein
the holder main body part non-detachably retains the power source.

8. The bicycle power source holder as recited in claim 1, wherein
the frame attaching part is attached to the bicycle frame so that, while mounted to the bicycle frame, when a predetermined force is applied to the holder main body part in a lateral direction, the holder main body part moves in the lateral direction of the bicycle.

9. The bicycle power source holder as recited in claim 1, wherein
the frame attaching part comprises a retaining section configured to detachably retain the holder main body part.

10. The bicycle power source holder as recited in claim 9, wherein
the frame attaching part comprises a movement preventing section that prevents movement of the holder main body part in a longitudinal direction of a bicycle while the holder main body part is retained.

11. The bicycle power source holder as recited in claim 9, further comprising
a regulating section that regulates movement of the holder main body part when the holder main body part detaches from the frame attaching part.

12. The bicycle power source holder as recited in claim 11, wherein
the regulating section is a bendable member.

13. The bicycle power source holder as recited in claim 12, wherein
the bendable member is an elongated member.

14. The bicycle power source holder as recited in f claim 9, wherein
the retaining section comprises an elastic member having a C-shaped cross section.

15. A bicycle power source holder comprising:
a holder main body part configured to retain a power source; and a frame attaching part configured to movably mount the holder main body part to a bicycle so that the holder main body part is movably mounted in a lateral direction of a bicycle, the frame attaching part comprising an elongated hole section that is formed with at least one elongated hole that extends in the lateral direction with respect to the bicycle while the holder main body part is mounted to the bicycle frame.

16. The bicycle power source holder as recited in claim 15, wherein the elongated hole section includes a plurality of the elongated holes.

17. The bicycle power source holder as recited in claim 15, wherein the frame attaching part comprises a fixing member that passes through the at least one elongated hole to fix the elongated hole section to the bicycle frame.

18. A bicycle power source holder comprising:

a holder main body part configured to retain a power source; and a frame attaching part configured to movably mount the holder ma body part to a bicycle frame so that the holder main body part is movably mounted in a lateral direction of a bicycle, the holder main body part and the frame attaching part being integrally formed.

19. A bicycle power source holder comprising:

a holder main body part configured to retain a power source; and a frame attaching part configured to attach the holder main body part to a bicycle frame, the frame attaching part being attached to the holder main body part by a string having a first end attached to the holder main body part and a second end attached to the frame attaching part, the frame attaching part being detachable to the holder main body part at a retaining section of the frame attaching part in a lateral direction that is transverse to a longitudinal direction of the bicycle frame while the holder main body part is attached to the bicycle frame when an impact is applied to the holder main body part.

\* \* \* \* \*